United States Patent
Friel et al.

(10) Patent No.: US 9,749,718 B1
(45) Date of Patent: Aug. 29, 2017

(54) ADAPTIVE TELEMETRY BASED ON IN-NETWORK CROSS DOMAIN INTELLIGENCE

(71) Applicant: Cisco Technology, Inc., San Jose, CA (US)

(72) Inventors: Joseph Friel, San Jose, CA (US); Hugo Latapie, San Jose, CA (US); Andre Surcouf, San Jose, CA (US); Enzo Fenoglio, Issy-les-Moulineaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/215,098

(22) Filed: Jul. 20, 2016

(51) Int. Cl.
 *G08C 19/16* (2006.01)
 *H04Q 9/00* (2006.01)

(52) U.S. Cl.
 CPC ..................... *H04Q 9/00* (2013.01)

(58) Field of Classification Search
 CPC ....................................................... H04Q 9/00
 USPC .................................... 340/870.01
 See application file for complete search history.

(56) References Cited

U.S. PATENT DOCUMENTS

| | | | | |
|---|---|---|---|---|
| 6,298,471 B1 * | 10/2001 | Schreiber | ............ | G06F 17/5045 716/108 |
| 8,918,374 B1 * | 12/2014 | Vo | ..................... | G06F 17/30312 382/166 |
| 2003/0009469 A1 * | 1/2003 | Platt | .................. | G06F 17/30038 |
| 2004/0228422 A1 * | 11/2004 | Silveira | ................. | H03F 1/3241 375/299 |
| 2007/0053432 A1 * | 3/2007 | Kondo | ................. | H04N 19/105 375/240.12 |
| 2008/0095464 A1 * | 4/2008 | Goertzen | ............. | H04N 19/597 382/278 |
| 2010/0094923 A1 * | 4/2010 | Martinez | ............... | H04W 4/003 709/201 |
| 2010/0125188 A1 * | 5/2010 | Schilling | ............. | A61B 5/0002 600/336 |
| 2014/0032092 A1 * | 1/2014 | Vu | ........................ | B64G 1/402 701/123 |
| 2015/0109926 A1 * | 4/2015 | Jin | ........................ | H04W 40/04 370/235 |
| 2015/0142998 A1 * | 5/2015 | Burtch | ................ | G06F 13/4221 710/72 |
| 2015/0369705 A1 * | 12/2015 | Kruglick | ................ | G06Q 10/10 702/188 |

* cited by examiner

*Primary Examiner* — Santiago Garcia
(74) *Attorney, Agent, or Firm* — Polsinelli PC (57) ABSTRACT

Disclosed are systems, methods, and computer-readable storage media for adaptive telemetry based on in-network cross domain intelligence. A telemetry server can receive at least a first telemetry data stream and a second telemetry data stream. The first telemetry data stream can provide data collected from a first data source and the second telemetry data stream can provide data collected from a second data source. The telemetry server can determine correlations between the first telemetry data stream and the second telemetry data stream that indicate redundancies between data included in the first telemetry data stream and the second telemetry data stream, and then adjust, based on the correlations between the first telemetry data stream and the second telemetry data stream, data collection of the second telemetry data stream to reduce redundant data included in the first telemetry data stream and the second telemetry data stream.

17 Claims, 6 Drawing Sheets

ADAPTIVE TELEMETRY BASED ON IN-NETWORK CROSS DOMAIN INTELLIGENCE

TECHNICAL FIELD

This disclosure relates in general to the field of computer networks and, more particularly, pertains to adaptive telemetry based on in-network cross domain intelligence.

BACKGROUND

Telemetry is the automatic measurement and transmission of data from remote data sources. Sensors at the data source collect and forward data to a central server, where the data can be reconstructed, analyzed and stored. The data can be collected at various layers or domains, including application, platform (e.g., operations system) infrastructure (e.g., network) and physical (e.g., power/temperature). While the gathered data can be extremely useful in monitoring and managing a network, resources, etc., the amount of data collected, forwarded, analyzed and stored can be overwhelming. Accordingly, improvements are needed.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

Disclosed are systems, methods, and computer-readable storage media for adaptive telemetry based on in-network cross domain intelligence. A telemetry server can receive at least a first telemetry data stream and a second telemetry data stream. The first telemetry data stream can provide data collected from a first data source and the second telemetry data stream can provide data collected from a second data source. The telemetry server can determine correlations between the first telemetry data stream and the second telemetry data stream that indicate redundancies between data included in the first telemetry data stream and the second telemetry data stream, and then adjust, based on the correlations between the first telemetry data stream and the second telemetry data stream, data collection of the second telemetry data stream to reduce redundant data included in the first telemetry data stream and the second telemetry data stream.

DETAILED DESCRIPTION

Disclosed are systems and methods for adaptive telemetry based on in-network cross domain intelligence. A brief introductory description of exemplary systems and networks, as illustrated in FIGS. 1 through 4, is disclosed herein, followed by a discussion of adaptive telemetry based on in-network cross domain intelligence. The disclosure now turns to FIG. 1.

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

Figure 1:
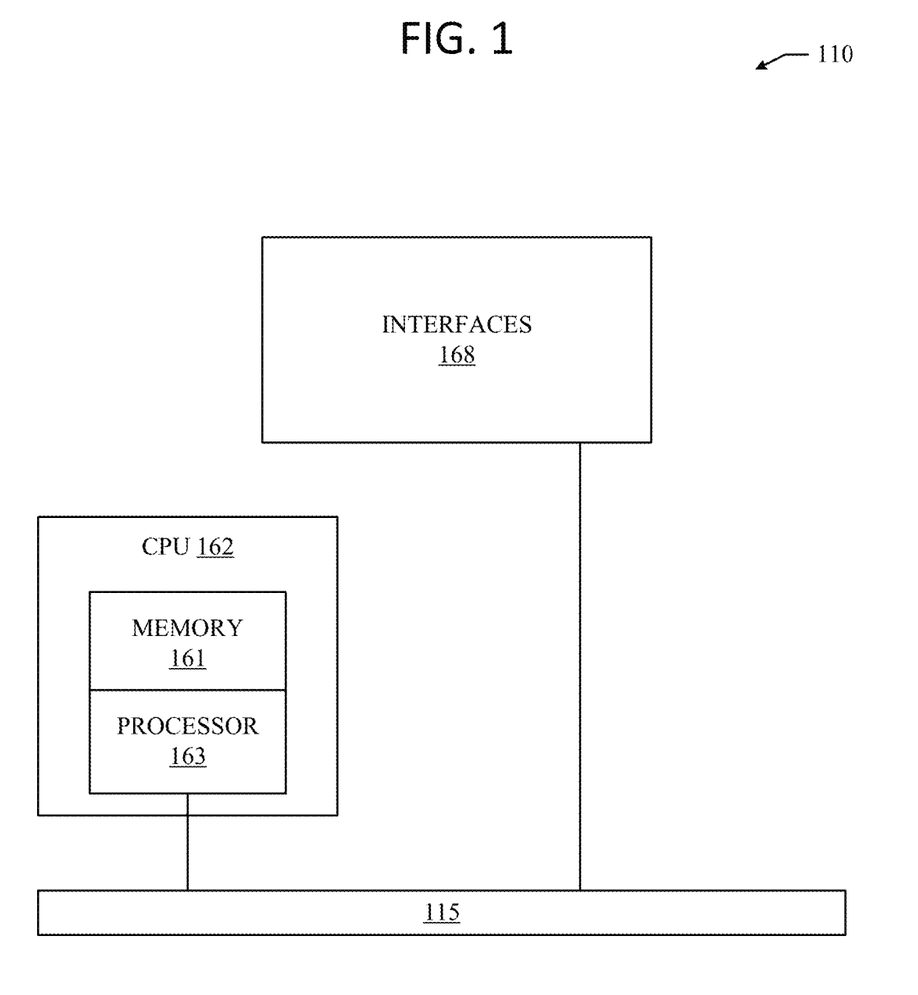
FIG. 1 illustrates an example network device according to some aspects of the subject technology.

FIG. 1 illustrates an exemplary network device 110 suitable for implementing the present technology. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present technology, it is by no means the only network device architecture on which the present technology can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
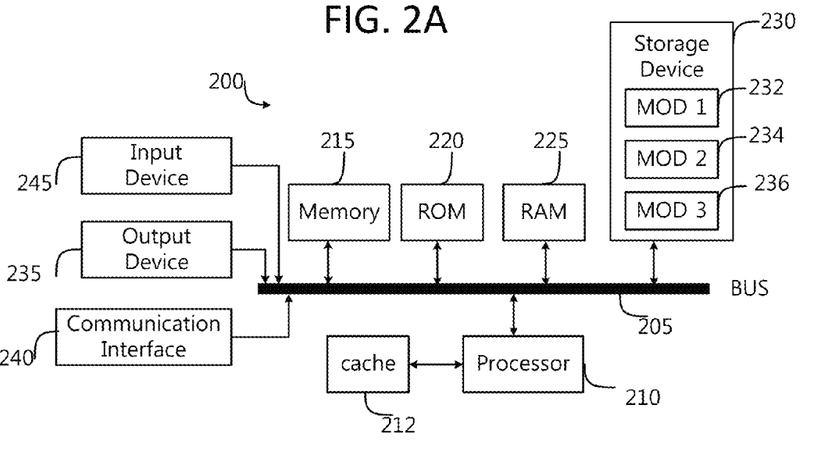
FIGS. 2A and 2B illustrate an example system embodiments according to some aspects of the subject technology.
Figure 2B:
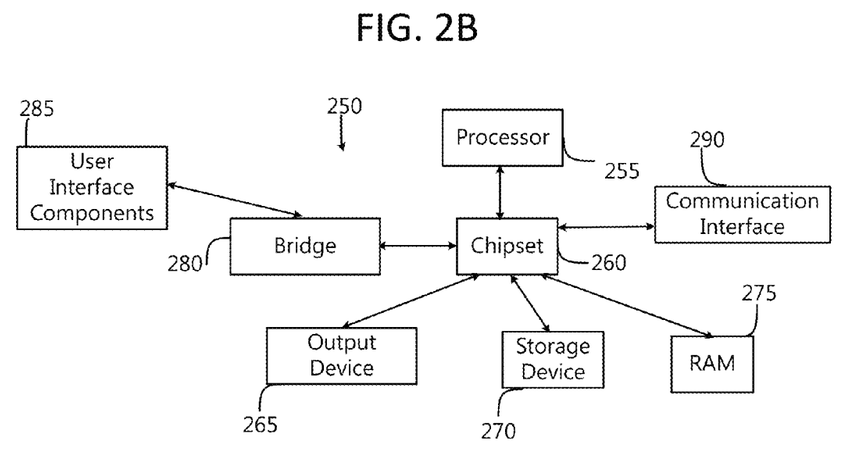

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
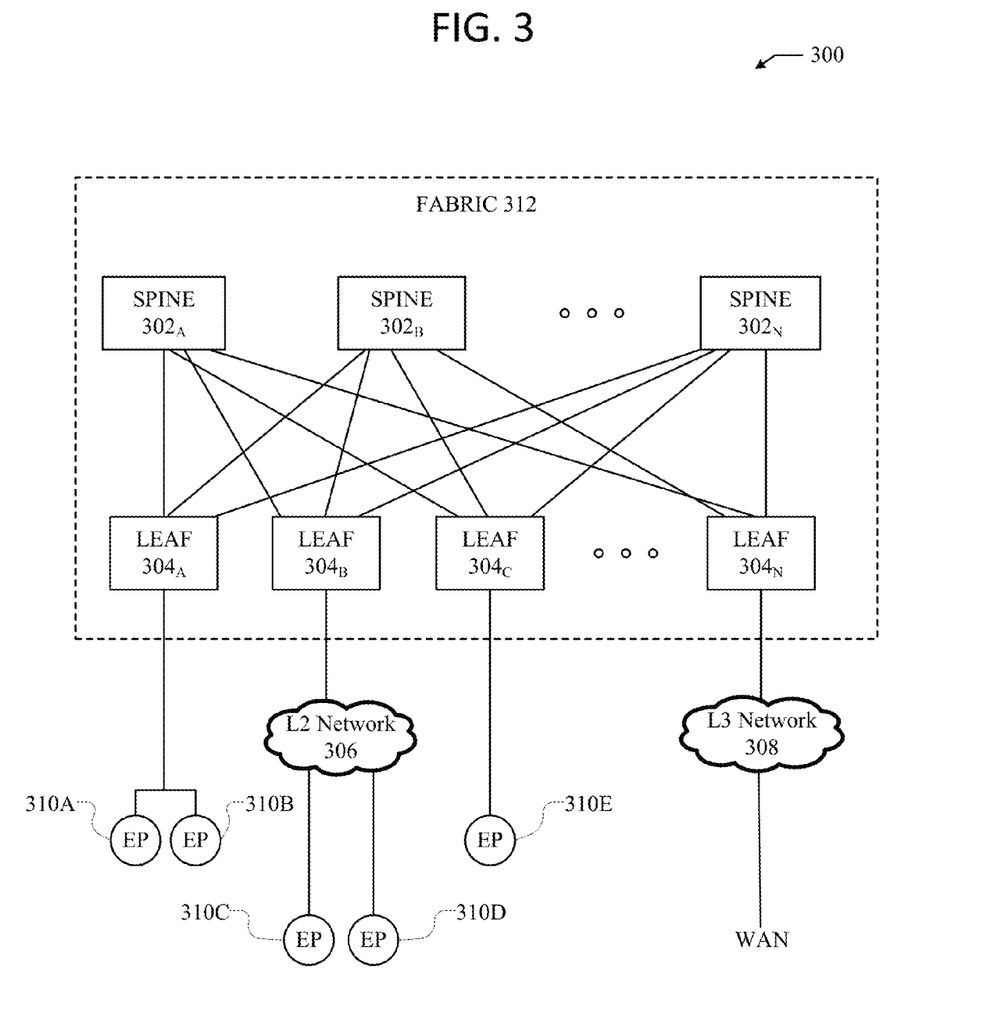
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, . . . , $302_N$ (collectively "302") connected to leaf switches $304_A$, $304_B$, $304_C$ . . . $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
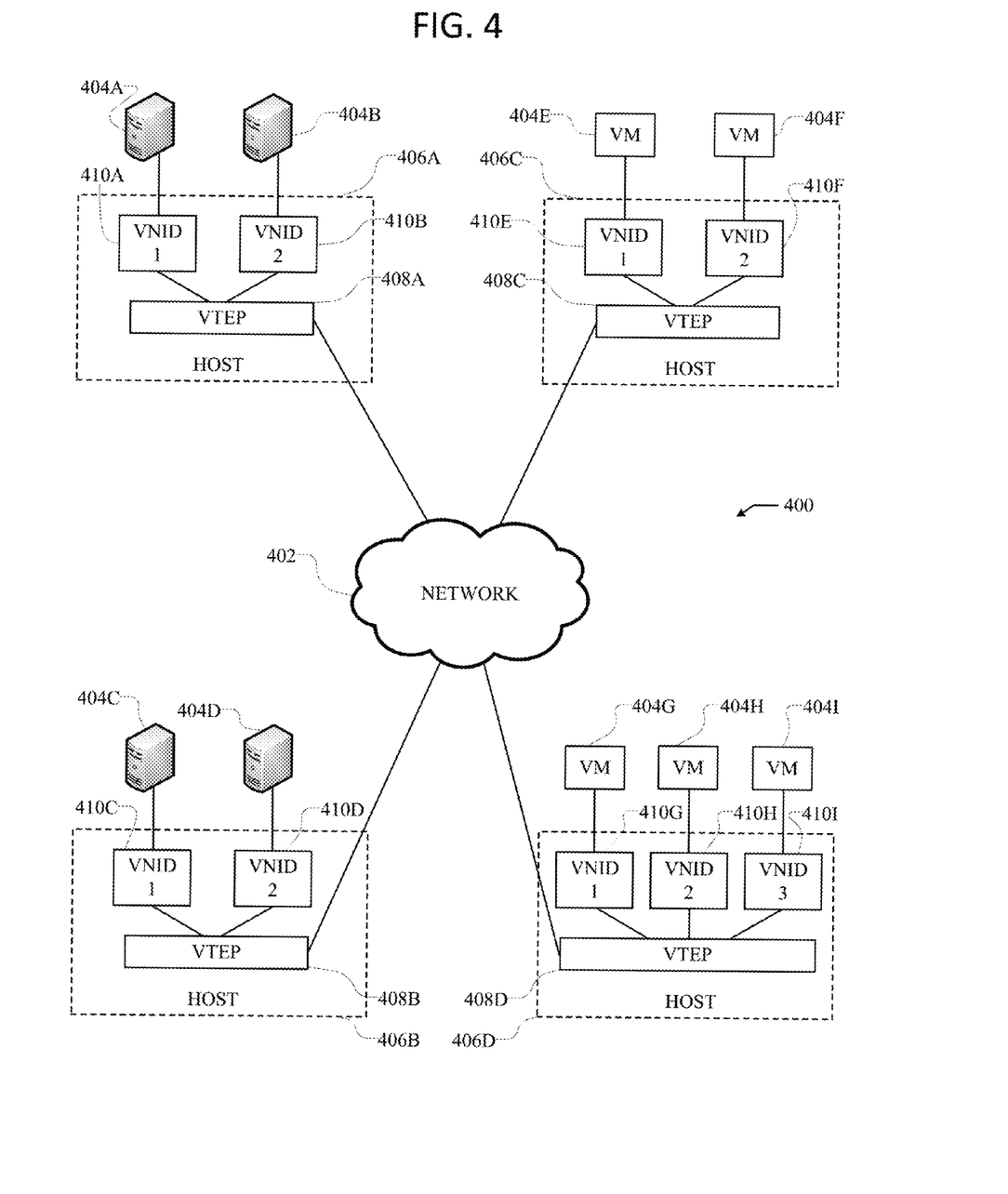
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Depending on the desired implementation in the network 400, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the network 400 illustrated in FIG. 4 is used for purposes of explanation, a network system may be implemented with many variations, as appropriate, in the configuration of network platform in accordance with various embodiments of the present disclosure.

Having disclosed a brief introductory description of exemplary systems and networks, the discussion now turns to adaptive telemetry based on in-network cross domain intelligence. A telemetry server can receive telemetry data streams from multiple sensors in a network. Each telemetry data stream can include data collected from a data source, such as data from various compute and infrastructure domains, including application, platform (e.g., operations system) infrastructure (e.g., network) and physical (e.g., power/temperature). The telemetry server can analyze the telemetry data streams to determine correlations between the telemetry data streams that indicate redundancies in data. For example, the telemetry server can utilize multi-modal deep learning techniques to create models of the telemetry data streams and predict redundant data in the telemetry data streams. The telemetry server can then adjust data collection of the telemetry data streams based on the correlations to reduce collection of redundant data.

Figure 5:
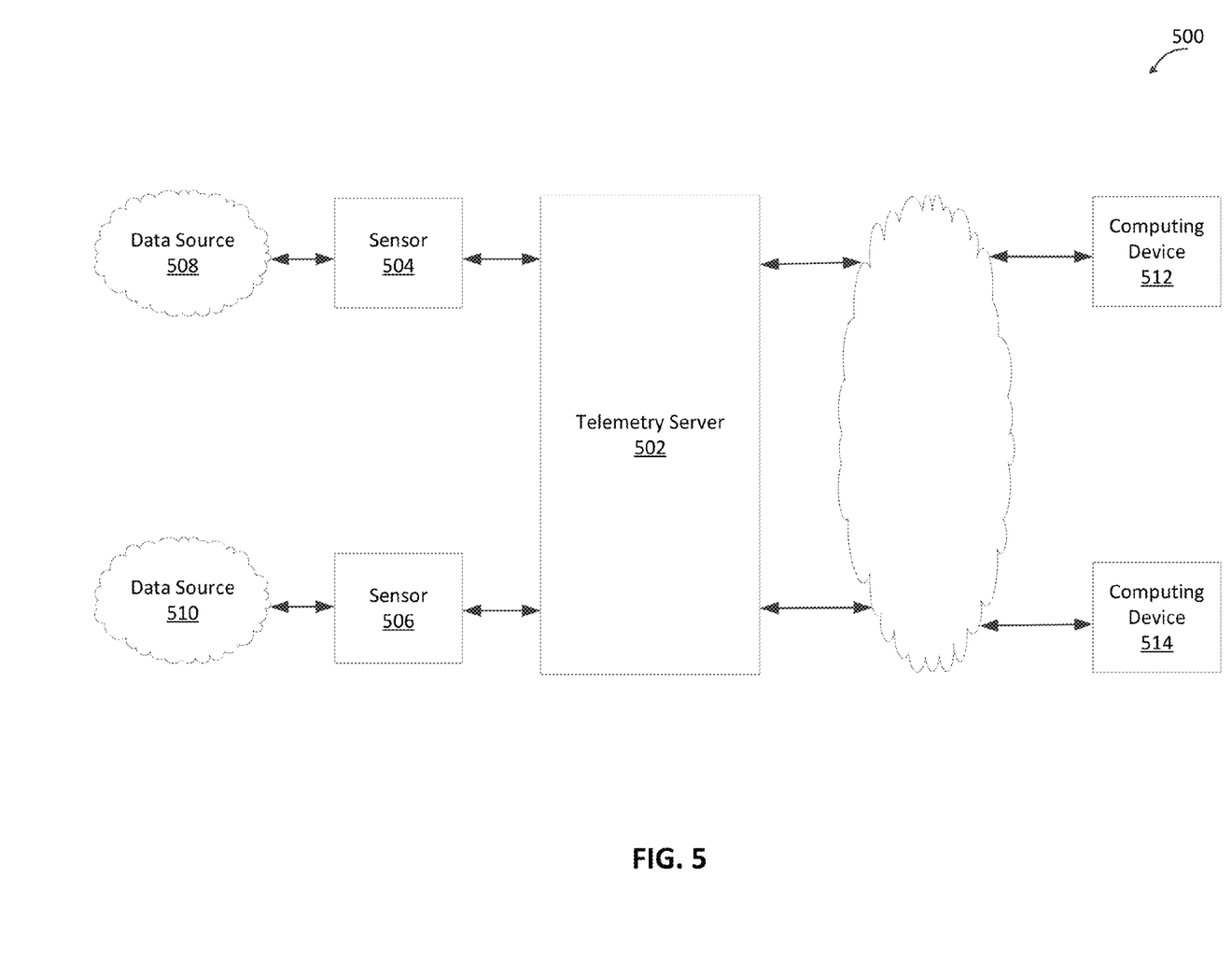
FIG. 5 illustrates a system for illustrates a system for adaptive telemetry based on in-network cross domain intelligence.

FIG. 5 illustrates a system for adaptive telemetry based on in-network cross domain intelligence. As shown, system 500 includes telemetry server 502 that can receive telemetry data streams from sensors 504 and 506. Sensors 504 and 506 can each include one or more sensors and/or computing devices configured to capture data from a data source and apply sampling and compression to the captured data to create a telemetry data stream. Sensors 504 and 506 can then transmit the telemetry data stream to telemetry server 502. As shown, sensor 504 gathers data from data source 508 and sensor 506 gathers data from data source 510. Data sources 508 and 510 can be any grouping of computing devices, applications, VMs, switches, etc. Sensors 504 and 506 can capture diverse data from various layers or compute and infrastructure domains, including application, platform (e.g., OS), infrastructure (e.g., network) and physical (e.g., power, temperature, etc.).

Sensors 504 and 506 can apply sampling and compression techniques to reduce the amount of data included in a telemetry data stream transmitted to telemetry server 502. Sampling can include varying the rate at which data is captured and/or included in a telemetry data stream. Compression can include applying compression algorithms that analyze the raw data and include only summarized results of the data in the telemetry data stream, while still preserving the context of the data.

Telemetry server 502 can forward the received telemetry data stream to one or more computing devices, such as computing devices 512 and 514, where the data can be reconstructed, stored and analyzed. To reduce the amount of data that is included in the telemetry data stream, telemetry server 502 can be configured to analyze the telemetry data streams to identify correlations between the data streams that indicate redundancies in the data included in the telemetry data streams. For example, telemetry server 502 can utilize multi-modal deep learning to identify correlation between the data streams.

Telemetry server 502 can use multi-modal deep learning to create models of the telemetry data signals, which can be used to learn how the telemetry data signals are correlated. Telemetry server 502 can use these models and correlations to predict future performance of a telemetry data signal, such as what data will be included in the telemetry data signal during specified periods of time.

In some embodiments, telemetry server 502 can utilize multimodal deep learning to identify telemetry signals in the data that indicate data redundancies for a specified time period. Likewise, telemetry server 502 can utilize multi-modal deep learning to identify specified periods of time when telemetry data streams will include unique data (i.e., not redundant data). For example, telemetry server 502 can create models of multiple telemetry data signals and compare the models to identify redundant data and/or unique data.

Based on the models, telemetry server 502 can identify one or more telemetry signals such as a time of day, week, month, etc., during which two or more telemetry data streams will or will not include redundant data for a specified time period. As another example, telemetry server 502 can determine a telemetry signal such as an occurrence of data or combination of data in a telemetry data signal that indicates that two or more telemetry data streams will or will not include redundant data for a specified time period.

Telemetry server 502 can be configured to adjust data collection of the telemetry data streams based on the correlations. For example telemetry server 502 can monitor the telemetry data streams for the identified telemetry signals and, upon detection of a telemetry signal, transmit commands to sensor 504 and/or sensor 506 to adjust sampling and/or compression of their respective telemetry data stream to reduce redundant data. Likewise, telemetry server 502 can transmit commands to computing devices 512 and 514 to adjust reconstruction of telemetry data streams to reduce redundant data.

As an example, telemetry server 502 can monitor data streams received from sensors 504 and 506 including data captured from data sources 508 and 501. In response to detecting a telemetry signal indicating that data included in the telemetry data streams will be redundant at a specified time or during a specified time period, telemetry server 502 can transmit a command to sensor 504 and/or sensor 506 to reduce the rate at which data is sampled from data source 508 and/or data source 510 for inclusion in the telemetry data stream. As another example, in response to detecting a telemetry signal indicating that data included in the telemetry data streams will be unique, for example as a result of the specified time period having lapsed, telemetry server 502 can transmit a command to sensor 504 and/or 506 to readjust the rate at which data is sampled from data source 508 and/or 510 to a previous state.

Telemetry server 502 can continuously apply multimodal deep learning techniques to the telemetry data streams to identify correlations between the telemetry data stream and adjust data collection to reduce redundant data in the telemetry data streams. In this way, telemetry server 502 can continue to learn from the telemetry data streams and adjust data collection to reduce data redundancies. Telemetry server 502 can also use other known data reduction strategies, in addition to multimodal deep learning, to reduce redundant data collection.

To ensure that the created models are accurate, telemetry server 502 can test the created models. For example, telemetry server 502 can remove one of the inputs and rest the ability of the shared model to predict the missing modality.

Figure 6:
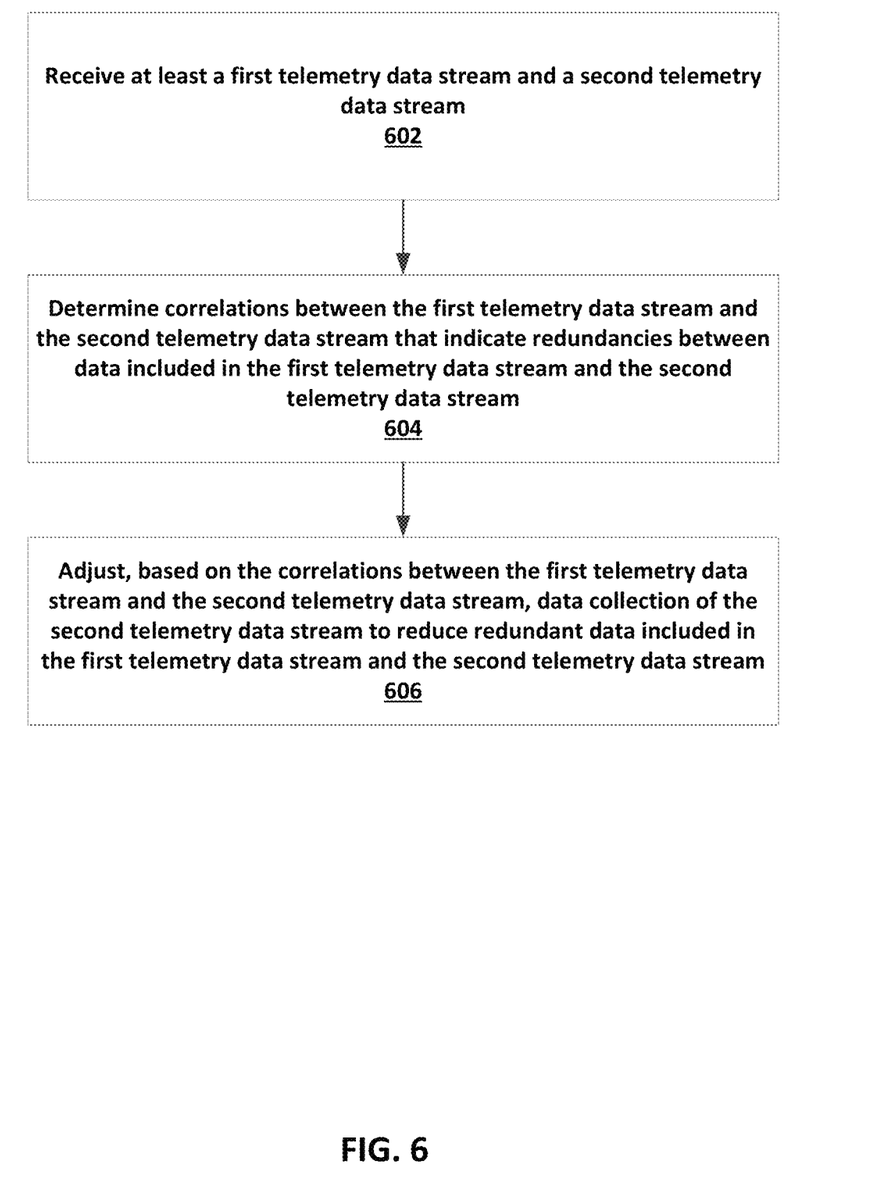
FIG. 6 illustrates an example method of adaptive telemetry based on in-network cross domain intelligence.

FIG. 6 illustrates an example method of adaptive telemetry based on in-network cross domain intelligence. It should be understood that there can be additional, fewer, or alternative steps performed in similar or alternative orders, or in parallel, within the scope of the various embodiments unless otherwise stated.

At step 602 a telemetry server can receive at least a first telemetry data stream and a second telemetry data stream. The first telemetry data stream can provide data collected from a first data source and the second telemetry data stream can provide data collected from a second data source. The data sources can include various types of data, such as application, platform (e.g., operations system) infrastructure (e.g., network) and physical (e.g., power/temperature).

At step 604, the telemetry server can determine correlations between the first telemetry data stream and the second telemetry data stream that indicate redundancies between data included in the first telemetry data stream and the second telemetry data stream. For example, the telemetry server can utilize multimodal deep learning techniques to identify telemetry signals indicating that the second telemetry data stream will include redundant data for a specified time period following an occurrence of the telemetry signal.

At step 606, the telemetry server can adjust, based on the correlations between the first telemetry data stream and the second telemetry data stream, data collection of the second telemetry data stream to reduce redundant data included in the first telemetry data stream and the second telemetry data stream. For example the telemetry server can monitor the telemetry data streams for a telemetry signal indicating that the second telemetry data stream will include redundant data and adjust data collection of the second telemetry data stream in response to detecting the telemetry signal. This can include reducing a sampling rate at which data is collected from the second data source, adjusting a compression method applied to data collected from the second data source, reducing a reconstruction rate for data included in the second telemetry data stream, etc., for the specified time period. After the specified time period has lapsed, the telemetry server can readjusting data collection of the second data stream to a previous state, such as the state prior to detecting the telemetry signal.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A method comprising:
receiving, via an interface of a telemetry server, at least a first telemetry data stream and a second telemetry data stream, the first telemetry data stream providing data collected from a first data source and the second telemetry data stream providing data collected from a second data source;
determining, by the telemetry server, correlations between the first telemetry data stream and the second telemetry data stream indicating redundancies between data included in the first telemetry data stream and the second telemetry data stream, wherein determining correlations between the first telemetry data stream and the second telemetry data stream comprises identifying a telemetry signal indicating that the second telemetry data stream will include redundant data for a specified time period following an occurrence of the telemetry signal; and
adjusting, based on the correlations between the first telemetry data stream and the second telemetry data stream, data collection of the second telemetry data stream to reduce redundant data included in the first telemetry data stream and the second telemetry data stream, wherein adjusting data collection of the second telemetry data stream is performed in response to detecting the telemetry signal.

2. The method of claim 1, wherein adjusting data collection of the second telemetry data stream comprises:
reducing a sampling rate at which data is collected from the second data source for inclusion in the second telemetry data stream.

3. The method of claim 1, wherein adjusting data collection of the second telemetry data stream comprises:
adjusting a compression method applied to data collected from the second data source for inclusion in the second telemetry data stream.

4. The method of claim 1, wherein adjusting data collection of the second telemetry data stream comprises:
reducing a reconstruction rate for data included in the second telemetry data stream.

5. The method of claim 1, further comprising:
after adjusting data collection of the second telemetry data stream:
determining that the specified time period following occurrence of the telemetry signal has lapsed, and
readjusting data collection of the second data stream to a previous state.

6. The method of claim 1, wherein determining correlations between the first telemetry data stream and the second telemetry data stream is accomplished using multimodal deep learning.

7. A system comprising:
one or more computer processors; and
a memory storing instructions that, when executed by the one or more computer processors, cause the system to:
receive at least a first telemetry data stream and a second telemetry data stream, the first telemetry data stream providing data collected from a first data source and the second telemetry data stream providing data collected from a second data source;
determine correlations between the first telemetry data stream and the second telemetry data stream indicating redundancies between data included in the first telemetry data stream and the second telemetry data stream, wherein determining correlations between the first telemetry data stream and the second telemetry data stream comprises identifying a telemetry signal indicating that the second telemetry data stream will include redundant data for a specified time period following an occurrence of the telemetry signal; and
adjust, based on the correlations between the first telemetry data stream and the second telemetry data stream, data collection of the second telemetry data stream to reduce redundant data included in the first telemetry data stream and the second telemetry data stream, wherein adjusting data collection of the second telemetry data stream is performed in response to detecting the telemetry signal.

8. The system of claim 7, wherein adjusting data collection of the second telemetry data stream comprises:
reducing a sampling rate at which data is collected from the second data source for inclusion in the second telemetry data stream.

9. The system of claim 7, wherein adjusting data collection of the second telemetry data stream comprises:
adjusting a compression method applied to data collected from the second data source for inclusion in the second telemetry data stream.

10. The system of claim 7, wherein adjusting data collection of the second telemetry data stream comprises:
reducing a reconstruction rate for data included in the second telemetry data stream.

11. The system, of claim 7, wherein the instructions further cause the system to:
after adjusting data collection of the second telemetry data stream:
determine that the specified time period following occurrence of the telemetry signal has lapsed, and
readjust data collection of the second data stream to a previous state.

12. The system of claim 7, wherein determining correlations between the first telemetry data stream and the second telemetry data stream is accomplished using multimodal deep learning.

13. A non-transitory computer-readable medium storing instructions that, when executed by the one or more computer processors of a computing device, cause the computing device to:
- receive at least a first telemetry data stream and a second telemetry data stream, the first telemetry data stream providing data collected from a first data source and the second telemetry data stream providing data collected from a second data source;
- determine correlations between the first telemetry data stream and the second telemetry data stream indicating redundancies between data included in the first telemetry data stream and the second telemetry data stream, wherein determining correlations between the first telemetry data stream and the second telemetry data stream comprises identifying a telemetry signal indicating that the second telemetry data stream will include redundant data for a specified time period following an occurrence of the telemetry signal; and
- adjust, based on the correlations between the first telemetry data stream and the second telemetry data stream, data collection of the second telemetry data stream to reduce redundant data included in the first telemetry data stream and the second telemetry data stream, wherein adjusting data collection of the second telemetry data stream is performed in response to detecting the telemetry signal.

14. The non-transitory computer-readable medium of claim 13, wherein adjusting data collection of the second telemetry data stream comprises:
   reducing a sampling rate at which data is collected from the second data source for inclusion in the second telemetry data stream.

15. The non-transitory computer-readable medium of claim 13, wherein adjusting data collection of the second telemetry data stream comprises:
   adjusting a compression method applied to data collected from the second data source for inclusion in the second telemetry data stream.

16. The non-transitory computer-readable medium of claim 13, wherein adjusting data collection of the second telemetry data stream comprises:
   reducing a reconstruction rate for data included in the second telemetry data stream.

17. The non-transitory computer-readable medium, of claim 13, wherein the instructions further cause the computing device to:
   after adjusting data collection of the second telemetry data stream:
      determine that the specified time period following occurrence of the telemetry signal has lapsed, and
      readjust data collection of the second data stream to a previous state.

* * * * *